(12) United States Patent
Borsdorf

(10) Patent No.: US 8,139,835 B2
(45) Date of Patent: Mar. 20, 2012

(54) METHOD FOR NOISE REDUCTION IN DIGITAL IMAGES WITH LOCALLY DIFFERENT AND DIRECTIONAL NOISE

(75) Inventor: Anja Borsdorf, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1039 days.

(21) Appl. No.: 12/076,179

(22) Filed: Mar. 14, 2008

(65) Prior Publication Data

US 2008/0232665 A1     Sep. 25, 2008

(30) Foreign Application Priority Data

Mar. 21, 2007   (DE) .......................... 10 2007 013 570

(51) Int. Cl.
*G06K 9/00* (2006.01)
*G06K 9/46* (2006.01)
*G06K 9/40* (2006.01)
*A61B 6/00* (2006.01)
*G01N 23/00* (2006.01)

(52) U.S. Cl. ........ 382/131; 382/128; 382/249; 382/254; 378/4; 378/21

(58) Field of Classification Search .................. 382/128, 382/131, 249; 378/4–21
See application file for complete search history.

(56) References Cited

U.S. PATENT DOCUMENTS

| | | | |
|---|---|---|---|
| 5,907,593 A * | 5/1999 | Hsieh et al. | 378/4 |
| 6,741,739 B1 * | 5/2004 | Vincent | 382/191 |
| 7,245,776 B2 * | 7/2007 | Matsuura | 382/240 |
| 7,599,464 B2 * | 10/2009 | Raupach et al. | 378/4 |
| 2006/0235293 A1 | 10/2006 | Raupach | |
| 2007/0189635 A1 * | 8/2007 | Borsdorf et al. | 382/275 |

FOREIGN PATENT DOCUMENTS

| DE | 10305221 A1 | 8/2004 |
|---|---|---|
| DE | 10 2005 012 654 A1 | 3/2005 |

OTHER PUBLICATIONS

Borsdorf, A. et al.: "Wavelet Based Noise Reduction by Identification of Correlations" DAGM 2006, p. 21-30; Others.

(Continued)

*Primary Examiner* — Brian Q Le
*Assistant Examiner* — Jose M Torres
(74) *Attorney, Agent, or Firm* — Harness, Dickey & Pierce, P.L.C.

(57) ABSTRACT

A method is disclosed for noise reduction in images with locally different and directional noise, in particular for noise reduction in image data records of computed tomography. In at least one embodiment of the method, two image data records of an identical object region that have mutually independent noise are provided. The two image data records are decomposed by a discrete wavelet transformation into a number of frequency bands, detailed images having high frequency structures being obtained in at least two different directions. Noise images in the respective frequency bands and directions are obtained by subtracting a wavelet coefficient of the two input images. These noise images are used to estimate noise locally and as a function of direction, and on the basis of this estimate local threshold values are calculated and applied to the averaged wavelet coefficients of the input images. A result image with reduced noise is obtained after an inverse wavelet transformation.

15 Claims, 3 Drawing Sheets

OTHER PUBLICATIONS

Chang, S.G. et al.: "Spatially Adaptive Wavelet Thresholding with Context Modeling for Image Denoising" IEEE Trans. Image Processing, vol. 9, No. 9, 2000 p. 1522-1531; Others.

Pham, T. et al.: "Influence of Signal-to-Noise Ratio and Point Spread Function on Limits of Super-Resolution" Proc. of SPIE-IS&T Electronic Imaging, SPIE vol. 5672 p. 169-180; Others.

German Office Action (dated Mar. 14, 2008).

R.R.Coifman, D.L.Donoho; Translation-Invariant De-Noising; in: Lecture Notes in Statistics: Wavelets and Statistics, vol. 103, 1995, pp. 125-150; Others.

D.L. Donoho, I.M. Johnstone; Ideal Spatial Adaptation by Wavelet Shrinkage; in: Biometika, vol. 81, 1994, pp. 425-455; 81; Magazine; 1994.

Mathworks Inc.: Wavelet Toolbox, 2006, http://www.mathworks.com/products/wavelet/.

\* cited by examiner

METHOD FOR NOISE REDUCTION IN DIGITAL IMAGES WITH LOCALLY DIFFERENT AND DIRECTIONAL NOISE

PRIORITY STATEMENT

The present application hereby claims priority under 35 U.S.C. §119 on German patent application number DE 10 2007 013 570.1 filed Mar. 21, 2007, the entire contents of which is hereby incorporated herein by reference.

FIELD

Embodiments of the present invention generally relate to a method for noise reduction in digital images with locally different and directional noise such as occurs, for example, in image data records of computed tomography.

BACKGROUND

The method can be used very advantageously for image data records in medical imaging, in particular for noise reduction in image data records of tomographic imaging. In the case of imaging methods based on X-radiation, such as computed tomography (CT), the resulting images retain quantum noise because of the finite quantum number. A reduction in this quantum noise by raising the X-ray dose is generally excluded because of the increasing radiation burden to the patient.

In these cases, the noise reduction is usually performed by using image filters. However, this image filtering cannot be allowed to lose any clinically relevant information. In particular, edges and small objects are not to be impaired by the filtering. Linear filters are generally excluded for this reason since, although they do reduce the noise, they also, however, simultaneously smooth beyond edges. As a result, the image sharpness is lessened and the detectability of small objects is reduced.

Consequently, use is made in practice of edge-preserving noise reduction methods. The aim of these known methods is to remove the noise in homogeneous image areas and at the same time to maintain the sharpness of edges and fine structures.

A known approach to edge-preserving noise reduction is wavelet thresholding methods such as are proposed, for example, in D. L. Donoho et al., "Ideal Spatial Adaptation by Wavelet Shrinkage", Biometica, Vol. 81, pages 425 to 455 (1994). In this case, the image to be denoised is decomposed into its wavelet coefficients. High frequency detail coefficients with an absolute value below a certain threshold are set to zero and coefficients are obtained for this. The difficulty with such a method consists in finding a suitable threshold value, chiefly for images with noise that is locally of different strength and is directional, such as is typical in CT images. If the threshold value is excessively large, this can lead to visible sharpness losses and the removal of small structures. On the other hand, the noise is reduced only unsatisfactorily by an excessively small threshold value.

Another approach to noise reduction in image data records of computed tomography is proposed in DE 102005012654 A1. In this method, two CT image data records of the identical object volume are produced by separate reconstruction of even and odd projections of a computed tomography scan. An attempt to distinguish between structures and noise in the images is made with the aid of correlation analyses of the two image data records. However, random correlations of the noise will also occur at some points, and so the noise cannot be adequately removed there.

SUMMARY

In at least one embodiment of the present invention, an improved method is specified for noise reduction in images with locally different and directional noise that can be applied with advantage to image data records in computed tomography, in particular.

In at least one embodiment of the proposed method, two image data records of an identical object region that have mutually independent noise are provided. The two image data records are decomposed by a discrete wavelet transformation into a number of frequency bands (multi-resolution decomposition) such that wavelet coefficients for each frequency band are respectively obtained for at least a low-pass filtered approximation image, a detailed image having high frequency structures in a first direction, and a detailed image having high frequency structures in a second direction different from the first direction. The fundamentals of such a wavelet transformation are known to the person skilled in the art. Subsequently, a difference image is calculated for each frequency band and each direction from the difference between the wavelet coefficients of the respective detailed images of the two image data records. Local standard deviations of the noise are calculated in the difference images for a prescribable size of image areas and are multiplied by a prescribable threshold value factor in order to obtain local threshold values for each frequency band and each direction. The size of these local threshold values is therefore a function of the standard deviation, respectively determined locally, of the noise in the different directions considered in the image, as well as of the respective frequency band. The wavelet coefficients of the two image data records are then averaged for each frequency band and each direction in order to obtain an averaged approximation image and averaged detailed images for each direction. Wavelet coefficients below the respectively calculated threshold value are then set to zero in the averaged detailed images, and wavelet coefficients above the local threshold values are obtained (hard thresholding) or are reduced by the amount of the respective threshold value (soft thresholding). Finally, the averaged detailed images and approximation images resulting from this step are subjected to an inverse wavelet transformation such that a noise reduced image of the object region is obtained as a result and can be displayed on a monitor.

At least one embodiment of the present invention is therefore based on a wavelet thresholding method, this being made, however, of two image data records of identical object region, which have mutually independent noise, in order to estimate the threshold values to be applied. The threshold values are in this case respectively determined from the wavelength coefficients firstly for different frequency bands and different directions in the image, and secondly also for locally different positions in the image. A suitable scaling is undertaken via the prescribable threshold value factor. The size of the prescribable area for determining the standard deviations of the noise can be selected suitably depending on image content and image size and/or image resolution. Empirical values are available here owing to the previously applied techniques of noise reduction. The proposed method adapts the level of the threshold values to the noise level and also permits the removal of noise dependent on the location and direction without markedly employing edges and structures.

In an example embodiment of the method for application in computed tomography, the two image data records of the identical object region are reconstructed from two disjoint subsets of projections of a computed tomography scan. For example, it is possible here to assign all the even projections of n projections to one image data record, and all the odd projections thereof to the other image data record.

The wavelet transformation is preferably carried out in at least one embodiment so as to obtain for each frequency band or each decomposition step (decomposition level) a detailed image having high frequency structures in a horizontal direction, a detailed image having high frequency structures in a vertical direction, and a detailed image having high frequency structures in a diagonal direction. It is possible in this way to estimate threshold values separately for the horizontal, the vertical and the diagonal image direction in which the noise is generally of different intensity, particularly in the case of CT pictures.

BRIEF DESCRIPTION OF THE DRAWINGS

The proposed method is explained once again in greater detail below with the aid of an example embodiment in conjunction with the drawings, in which.

DETAILED DESCRIPTION OF THE EXAMPLE EMBODIMENTS

Figure 1:
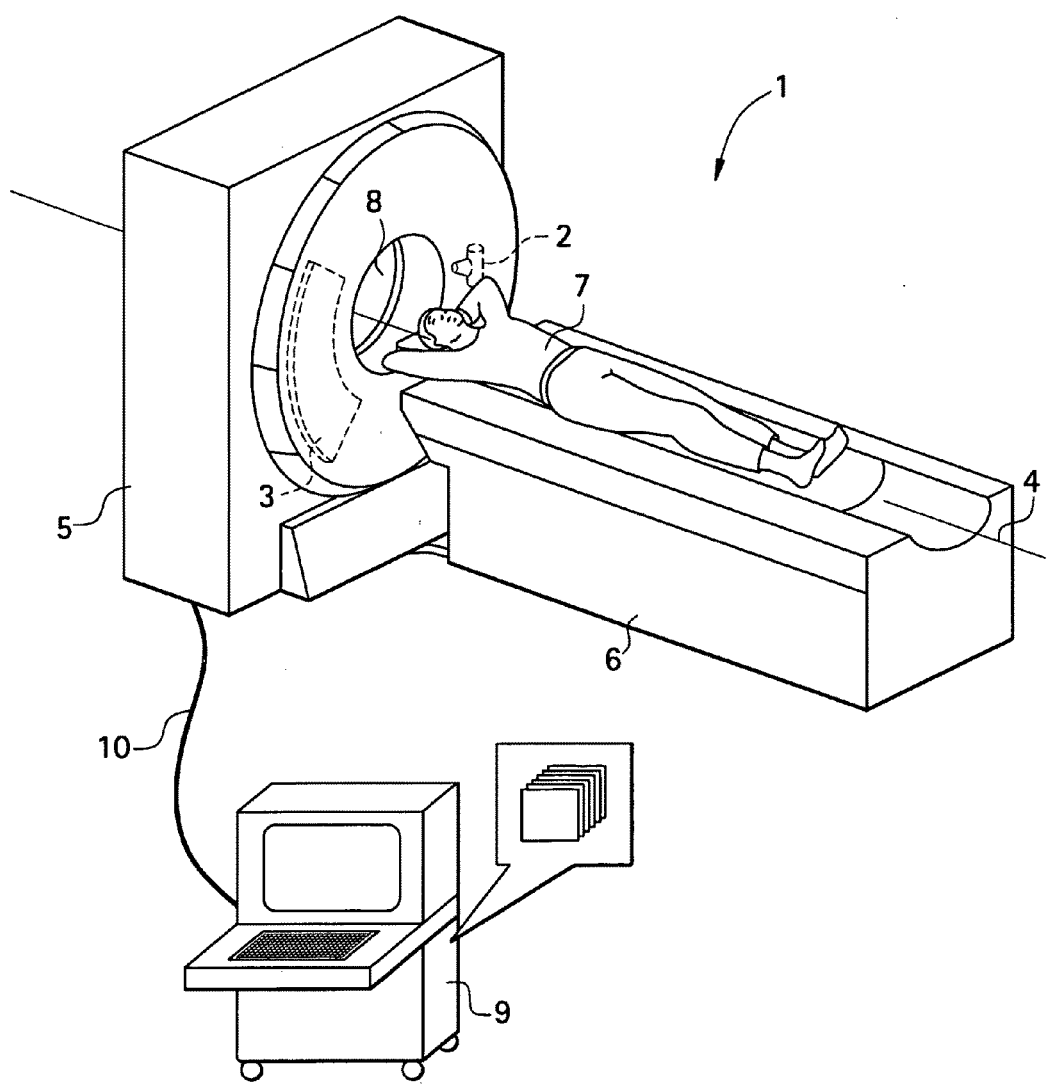
FIG. 1 shows a schematic of a computed tomography system with the aid of which an embodiment of the proposed method can be carried out.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The following example embodiments relate to the application of the proposed method for noise reduction in computed tomography pictures. FIG. 1 shows to this end a schematic of a computed tomography system 1 comprising the scanning system 5 and having a gantry with an X-ray tube 2 arranged thereon, and a detector 3 lying opposite. Located between the X-ray tube 2 and the detector 3 is an opening 8 into which a patient 7 on a movable patient couch 6 can be pushed along the system axis 4 and be scanned in the process. The control of the computed tomography system is executed via an arithmetic logic unit 9 that is connected to the scanning system 5 via a control and data line 10 and also controls the feed of the patient couch 6. The detector output data that are picked up by the detector 3 during scanning of the patient 7 are led through the control and data line 10 to the computer 9 and reconstructed there or, if appropriate, in another computing system with the aid of computer programs such that it is possible to output a tomographic image or volume display of the patient on a display screen of the arithmetic logic unit.

Figure 2:
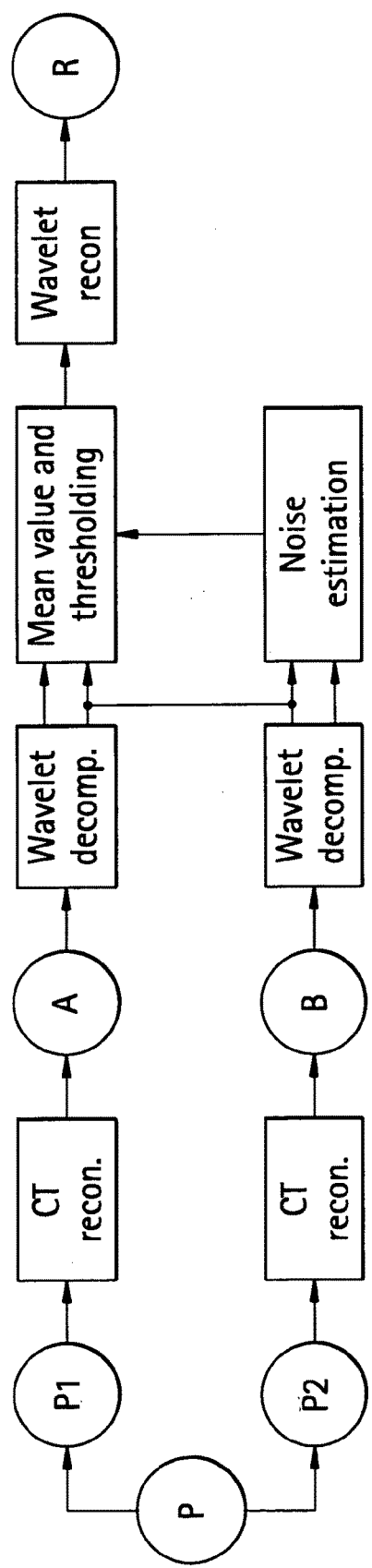
FIG. 2 shows a schematic of an embodiment of the proposed method.

In the present example, such a computed tomography system is used to carry out a CT scan in which a set P of projections is recorded at different projection angles with the gantry being rotated about the patient by an angle of 360°. These projections are used in the proposed method to produce two tomographic images A and B by performing a separate reconstruction of two disjoint subsets P1 and P2 of the P projections. One image is reconstructed, for example, with the aid of the even projections, and the other one is reconstructed with the aid of the odd projections. Two images A and B therefore obtain the same information but differ from one another in the noise. FIG. 2 shows this mode of procedure of splitting the universal set P of the projections into two subsets P1 and P2, from which separate images A and B are then reconstructed. Of course, it is also possible here for there to be a CT scan over a number of rotations of the gantry about the patient in order, for example, to produce a volume data record and a volume image resulting therefrom.

Two images A and B are subsequently decomposed into a number of frequency bands by a discrete wavelet transformation, for example a stationary wavelet transformation (SWT). Details on such a transformation can, for example, be taken from the publication by R. R. Coifman et al., "Translation-Invariant Denoising", in: lecture Notes in Statistics: Wavelets and Statistics, Vol. 103, pages 125 to 150 (1995). Four two-dimensional blocks of coefficients for each image are obtained at each decomposition level after this decomposition: a low-pass filtered approximation image C and three detailed images $w^H$, $w^V$ and $W^D$ that obtain high frequency structures in a horizontal (H), vertical (V) and diagonal (D) direction together with the noise in the corresponding frequency band.

Since the detailed images obtained from the two images A and B respectively contain the identical image information but different noise, the noise in the respective frequency bands and directions can be obtained by subtracting the respective detail coefficients of the two images A and B. These noise images are then used to estimate the local and image-dependent noise for the images A and B. This estimate is used to calculate local threshold values, and applied to the averaged wavelet coefficients of the input images A and B. Calculating only one inverse wavelet transformation then yields a denoised result image (compare FIG. 2), which corresponds to the reconstruction result in the use of all the projections of the CT scan, but has an improved signal-to-noise ratio.

This mode of procedure is explained once again in detail below. The two input images $A=S+N_A$ and $B=S+N_B$ contain the same image information S, but differing noise $N_A \neq N_B$. The standard deviations of the noise in the separately reconstructed images can be assumed to be equal, since the number of the quanta contributing to the signal is approximately the same. However, the noise N in A and B rises in proportion to the reconstruction with the total number of projections, or the mean value of the two input images N=0.5 (A+B), by the factor $\sqrt{2}$. It can be assumed that the noise in A and B is unaveraged. A noise image free from structures is obtained by calculating the difference image $D=A-B=N_A-N_B$. The standard deviations of the noise $\sigma_A$ and $\sigma_B$ can be estimated with the aid of the standard deviation in the difference image $\sigma_D$:

$$\sigma_A = \sigma_B = \sigma_D/\sqrt{2}.$$

It therefore follows for the standard deviation in the average image M that:

$$\sigma_M = \sigma_A/\sqrt{2} = \sigma_D/2.$$

In order to calculate a threshold value as a function of orientation for each decomposition level in relation to the wavelet-based de-noising, the noise is estimated separately in the individual frequency bands and orientations. Since the discrete wavelet transformation is a linear transformation, the differences between the detail coefficients of the wavelet decompositions of images A and B can also be used directly to estimate the noise. The differences $$D_1^H = W_{A,1}^H - W_{B,1}^H; D_1^V = W_{A,1}^V - W_{B,1}^V; D_1^D = W_{A,1}^D - W_{B,1}^D$$

are calculated at each decomposition level 1, the indices A and B standing for the two input images. These difference images are now used to estimate the noise in the individual frequency bands.

In addition, noise is locally different in CT images. The noise is also additionally estimated in a locally dependent fashion for this reason. To this end, the standard deviation of the noise is calculated locally in the difference image inside m×m large pixel regions about the respective position. Three images $\sigma_1^H$, $\sigma_1^V$, $\sigma_1^D$ are therefore obtained for each decomposition level 1 with the local standard deviations of the noise in the difference images in the horizontal, vertical and diagonal direction. It is thereby possible to calculate local threshold values as a function of orientation and level:

$$\tau_1^H = k^* \sigma_1^H/2; \tau_1^V = k^* \sigma_1^V/2; \tau_1^D = k^* \sigma_1^D/2.$$

Figure 3:
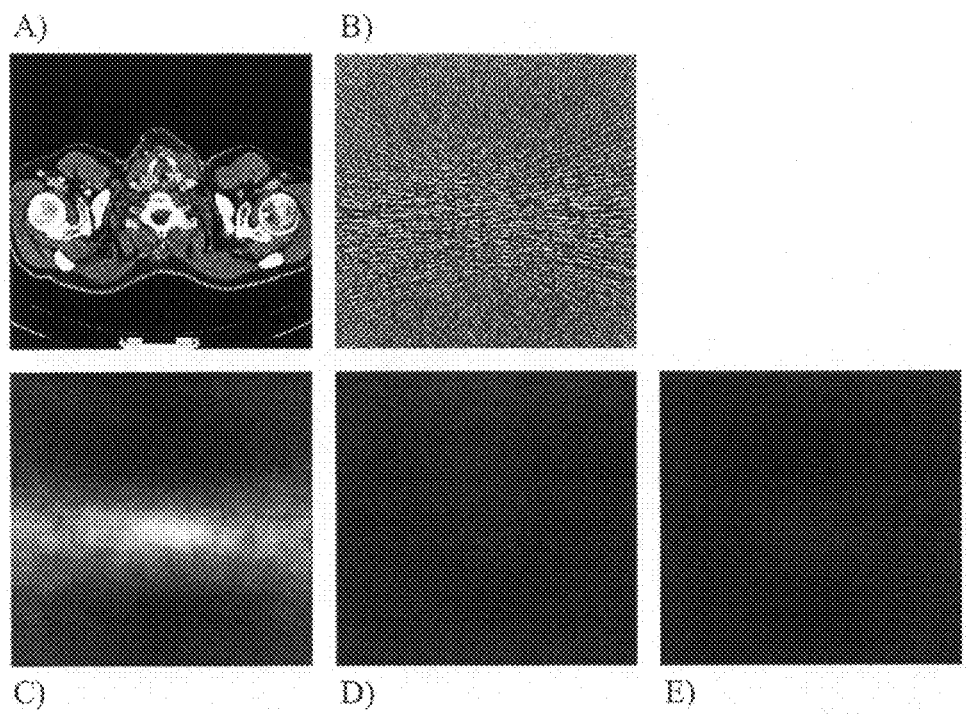
FIG. 3 shows an example of local, directionally dependent threshold values in accordance with an embodiment of the proposed method at a first decomposition level.

The constant k controls the extent of the noise reduction. The larger k is selected, the more extensive is the noise reduction. FIG. 3 shows to this end the threshold values for the first decomposition level for a CT image with strong directional noise. Here, the average image M from the two input images A and B appears to be recognized in FIG. 3a. FIG. 3b shows the difference from the two input images A and B. Thus, only the noise is contained in this difference image D. FIGS. 3c to 3e then show the local threshold values $\tau_1^H$ for the horizontal direction (FIG. 3c), $\tau_1^V$ for the vertical direction (FIG. 3d) and $\tau_1^D$ for the diagonal direction (FIG. 3e) that are obtained at the first decomposition level in the way described.

The calculated threshold values are subsequently applied to the averaged wavelet coefficients of the input images. Hard or soft thresholding is possible in this case. With hard thresholding, all the coefficients with an absolute value smaller than the threshold value are set to zero, and all the values thereabove are maintained without change. This has the advantage that edges and structures which rise from the noise are maintained unchanged. With soft thresholding, a more extensive smoothing is achieved in that the coefficients above the threshold are also attenuated by the amount of the threshold value. Of course, the threshold values are respectively applied here locally to the wavelet coefficients in accordance with their local calculation or estimation. After the thresholding, the noise reduced result image is calculated by inverse wavelet transformation of the modified, averaged coefficient.

Images with the same information but different noise can be generated by the separate reconstruction of the two CT images. In addition to the mode of procedure described in this example embodiment, the two images independent in terms of noise can also be generated with other techniques such as are described, for example, in DE 102005012654 A1, the entire disclosure content of which is hereby incorporated in this regard herein the present patent application, by reference.

Figure 4:
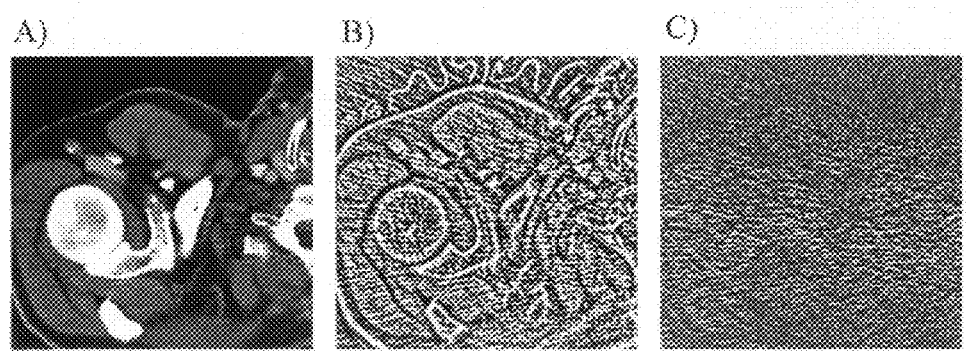
FIG. 4 shows an example of a noise reduction result in accordance with a proposed method by comparison with a standard method.

The provision of these two images independent in terms of noise with the same image information permits a reliable estimate of the local noise in different directions in the individual frequency bands. Consequently, a threshold value can be calculated as a function of the noise. High frequency components that can not rise from the noise are fundamentally incapable of being classified reliably as a structure by the viewer. For this reason, detail coefficients below the threshold value can be removed. The proposed method adapts itself automatically to the noise level, and furthermore permits the removal of noise that is a function of location and direction, without markedly impairing edges and fine structures. This is to be seen in FIG. 4, which shows a comparison of the proposed method for noise reduction with a standard method such as is to be obtained, for example, using the Wavelet Toolbox 2006 from Mathworks Inc. (compare http://www.mathworks.com/products/wavelet/). To this end, FIG. 4*a* shows the original image, while FIG. 4*b* shows the difference between the original image and the image with noise reduced by the standard method. The edges of the original image are clearly to be seen in this difference image. Consequently, image information is clearly lost at the edges by the standard method. By comparison with this, FIG. 4*c* shows the difference image between the noise reduced image obtained with the proposed method and the original image. It is clearly to be seen here that only the noise is removed, there being no significant impairment of edge structures. A threshold value factor of k=1.0 was used for this comparison.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for noise reduction in images with locally different and directional noise, comprising:
   providing two image data records of an identical object region that have mutually independent noise;
   decomposing the two image data records by a discrete wavelet transformation into a number of frequency bands for which wavelet coefficients are respectively obtained for at least
   a lowpass filtered approximation image,
   a detailed image having relatively high frequency structures in a first direction, and
   a detailed image having relatively high frequency structures in a second direction;
   calculating a difference image for each frequency band and each direction from the difference between the wavelet coefficients of the respective detailed images of the two image data records;
   calculating local standard deviations of the noise in the difference images for a prescribable size of image areas and multiplying them by a prescribable threshold value factor in order to obtain local threshold values for each frequency band and each direction;
   averaging the wavelet coefficients of the two image data records for each frequency band and each direction to obtain an averaged approximation image and averaged detailed images for each direction;
   at least one of obtaining, in the averaged detailed images, wavelet coefficients above the local threshold values and reducing wavelet coefficients by the amount of the respective threshold value, and setting wavelet coefficients below the threshold value to zero; and
   subjecting the resulting averaged detailed images and approximation images to an inverse wavelet transformation to obtain a noise reduced image of the object region.

2. The method as claimed in claim 1, wherein the two image data records are reconstructed from two disjoint subsets of projections of a computed tomography scan.

3. The method as claimed in claim 1, wherein the discrete wavelet transformation is executed so as to obtain wavelet coefficients for
   a lowpass filtered approximation image,
   a detailed image having relatively high frequency structures in a horizontal direction,
   a detailed image having relatively high frequency structures in a vertical direction, and
   a detailed image having relatively high frequency structures in a diagonal direction.

4. The method as claimed in claim 1, wherein the prescribable size of image areas for which the local standard deviations of the noise are calculated amounts to m×m pixels, where m≦32.

5. The method as claimed in claim 1, wherein the decomposition into a number of frequency bands is carried out in at least 3 decomposition steps.

6. The method as claimed in claim 2, wherein the discrete wavelet transformation is executed so as to obtain wavelet coefficients for
   a lowpass filtered approximation image,
   a detailed image having relatively high frequency structures in a horizontal direction,
   a detailed image having relatively high frequency structures in a vertical direction, and a detailed image having relatively high frequency structures in a diagonal direction.

7. The method as claimed in claim 2, wherein the prescribable size of image areas for which the local standard deviations of the noise are calculated amounts to m×m pixels, where m≦32.

8. The method as claimed in claim 5, wherein the prescribable size of image areas for which the local standard deviations of the noise are calculated amounts to m×m pixels, where m≦32.

9. The method as claimed in claim 3, wherein the prescribable size of image areas for which the local standard deviations of the noise are calculated amounts to m×m pixels, where m≦32.

10. The method as claimed in claim 6, wherein the prescribable size of image areas for which the local standard deviations of the noise are calculated amounts to m×m pixels, where m≦32.

11. The method as claimed in claim 2, wherein the decomposition into a number of frequency bands is carried out in at least 3 decomposition steps.

12. The method as claimed in claim 3, wherein the decomposition into a number of frequency bands is carried out in at least 3 decomposition steps.

13. The method as claimed in claim 10, wherein the decomposition into a number of frequency bands is carried out in at least 3 decomposition steps.

14. A non-transitory computer readable medium including program segments for, when executed on a computer device, causing the computer device to implement the method of claim 1.

15. The method as claimed in claim 1, wherein the method is for noise reduction in image data records of computed tomography.

* * * * *